Figure 1:
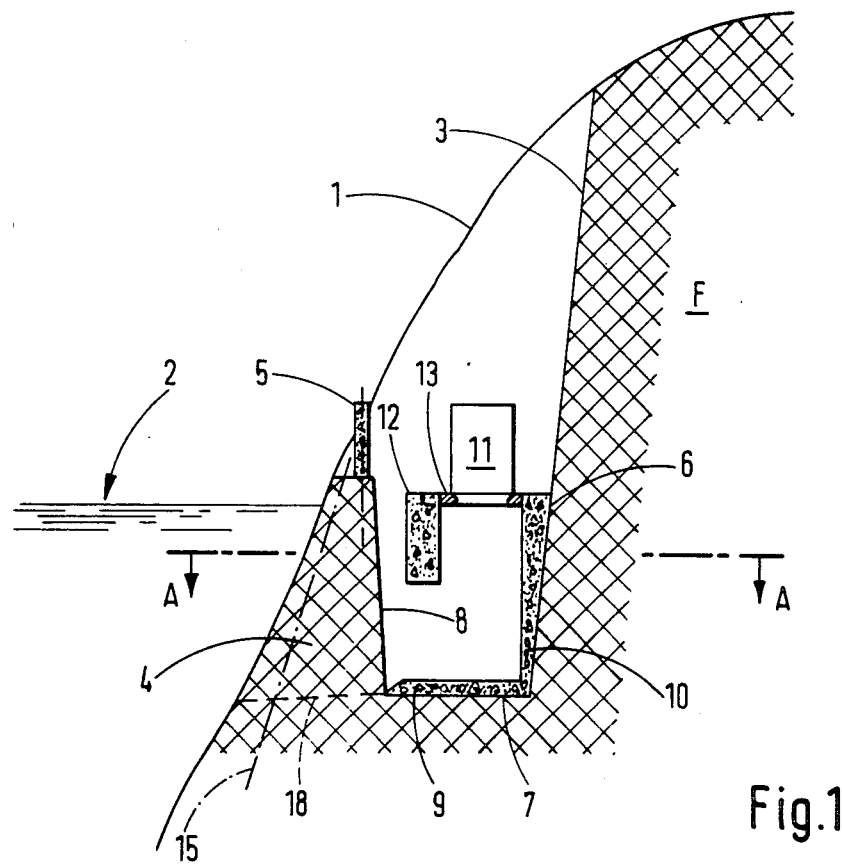

United States Patent [19]

Einstabland et al.

[11] Patent Number: 4,613,252

[45] Date of Patent: Sep. 23, 1986

[54] METHOD FOR THE BUILDING OF SEA WAVE POWER PLANTS

[75] Inventors: Tomas B. Einstabland, Asker; Günnar Aas, Oslo; Nicolay G. Berg, Oslo; Knut Bønke, Oslo; Ivar Oftebro, Billingstad, all of Norway

[73] Assignees: Kvaerner Brug A/S; Ingeniør F. Selmar A/S, both of Oslo, Norway

[21] Appl. No.: 779,453

[22] Filed: Sep. 24, 1985

[30] Foreign Application Priority Data

Sep. 25, 1984 [NO] Norway ............................. 843844

[51] Int. Cl.$^4$ .............................................. E02B 9/08
[52] U.S. Cl. ........................................ 405/76; 405/75; 405/195
[58] Field of Search ................... 405/75, 76, 77, 78, 405/52, 203, 204

[56] References Cited

U.S. PATENT DOCUMENTS

| | | | |
|---|---|---|---|
| 1,294,808 | 2/1919 | Jenkins | 405/76 |
| 1,347,829 | 7/1920 | Southwick | 405/76 |
| 4,193,714 | 3/1980 | Gjerde | 405/204 |

FOREIGN PATENT DOCUMENTS

84/04119  10/1984  World Int. Prop. O. ............ 405/77

Primary Examiner—Cornelius J. Husar
Assistant Examiner—Kristina I. Hall
Attorney, Agent, or Firm—Fleit, Jacobson, Cohn & Price

[57] ABSTRACT

A method of building a sea wave power plant of the type in which the power plant (11) must be installed near a steep rock wall (1). The installation site is determined inside the rock formation (F), at a distance from the open rock surface (1). A power plant well which is also serving as a building site (3) is blasted out from the rock formation with a natural rock wall (4) separating the well from the sea. After the plant is completed, the well is filled with water and the partition wall is removed by blasting, opening the well to the sea.

5 Claims, 2 Drawing Figures

METHOD FOR THE BUILDING OF SEA WAVE POWER PLANTS

The present invention relates to a method for the building of sea wave power plants.

Sea wave power plants of various configurations are known. Some of them have been placed in front of steep rock formations to utilize the energy in reflected waves. Also known are means for focusing sea waves toward the power plant site.

To achieve the best energy production the power plants must be located at places along the coast that are exposed to sea waves. This means that the work in building the power plant will be costly, and it is therefore important that on site labour be limited to a minimum.

A common solution for structures to be built at an exposed site is to have the structure fully or partially completed in protected surroundings, and then transport it to the building site. This will reduce the amount of labour to be performed at the exposed site. With consequent reductions in risk and expence. This principle is known from the building of harbours and bridges.

Although the described method has obvious advantages as compared to on-site-building, it should be noted that this method is also encumbered by an uncertainty, namely the installation of the prefabricated structure itself. For a power plant to be installed near a steep rock formation, the reflected waves will cause difficulties in performing the work, and on-site-work will only be possible for a few days of the year.

To assure the possibility for simplified construction work, one might wish to locate the power plant in a narrow inlet or ravine that may be closed off toward the open sea. In practice, however, one will rarely find such a crevasse of suitable dimensions at a locality with optimum wave conditions.

The object of this invention is to provide a method for building and/or installing power plants which permits the work to be performed under safe conditions even at the most exposed building sites.

The method according to this invention is characterized mainly by the features set forth in the appended claims.

Figure 2:
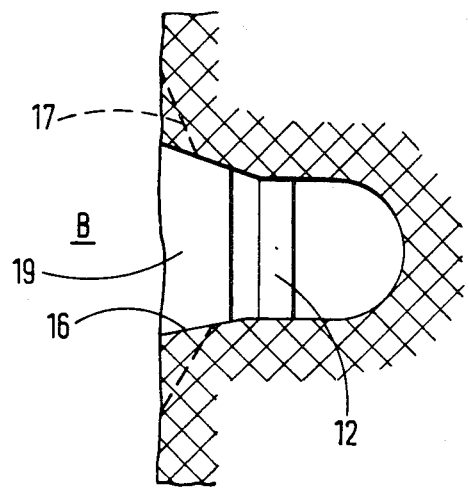

The invention will now be explained further by means of an example, and with reference to the drawings, wherein:

FIG. 1 shows a vertical section through a rock formation by the sea with a power plant well according to the present invention, and FIG. 2 is a sectional view along A—A on FIG. 1.

The example assumes that one has found by the seashore a suitable location for the building of a wave power plant, denoted by B in FIG. 2, where the rock formation 1 slopes steeply down, deep below the sea surface as shown in FIG. 1.

Instead of the previously known technique of constructing a power plant foundation in the slope 1, partially submerged under the sea surface 2, one has chosen to locate the power plant inside the rock formation F. To make space for the wave power section and the generating plant proper there is a well 3 blasted out of the rock formation, separated from the sea by the separating wall 4 consisting of the original rock formation which is levelled at the top and heightened by a dam 5 whose height and thickness is adjusted to local conditions, as is the thickness of the rock wall 4. The rear wall of the power plant well 3 is denoted by 6, and its bottom by 7. The outer or front surface 8 of the well is identical with the rear surface of the rock wall 4. As shown in FIG. 1, the well bottom 7 and the rear wall 6 are lined with poured concrete 9 and 10 resp., the concrete portion 10 also serving as foundation for the generating plant is indicated at 11. A cross beam 12 extends across the well 3 and serves as a partial support for the foundation 13 of the generating plant 11.

Should the rock in the rock formation 4 prove to be too weak, or should one wish to keep the dividing wall 4 as thin as possible, one may bolt and/or reinforce the dividing wall from the bed rock and upwards to the dam, as indicated by the tension rod 15. The same goes for the dam 5 itself.

When all construction work in the well 3 is completed, the well is filled with water and the dividing wall 4 with the dam 5 is removed by blasting. The blasting should be performed in such a way as to provide access to the well 3 over its entire width, from the bottom 9 and all the way up. The blasting is preferably performed with closely spaced drill holes to give the opening and even wall surface. The drill holes for the blasting may be oriented to give the opening an increasing cross section in the outward direction as shown at 16 and 17 in FIG. 2 and at 18 in FIG. 1. The opening is designated 19 in FIG. 2. The vertical side surface of the opening should preferably be shaped with a slightly cylindrical curve to give the opening a funnel-like quality.

The advantage of the method described above is that one may achieve optimum placement of the power plant with respect to the rock formation and the sea surface for maximum energy production. The method makes the engineers relatively independent of variable rock profiles and local wave and wind conditions. The only work that must be performed under water is the initial exploration, clean up after the blasting and possibly minor details during the final installation.

We claim:

1. A method of building a sea wave power plant of the type in which the power plant must be installed near a steep rock wall to achieve wave reflection, wave build up, characterized in that the installation site is determined inside the rock formation, at a location which is selected on the basis of optimal wave conditions, spaced from the open rock surface facing the sea, that a well is blasted out from the top of the rock formation to house the generating plant and to serve as a building site, with a natural rock partition wall separating the well from the sea, whereupon the wave power plant is completed, the generating section installed and finally the well is filled with water and the partition wall removed by blasting, opening the well to the sea.

2. A method as claimed in claim 1, characterized in that prior to the building of the power plant, a concrete dam is poured on to the top of the partition wall to adjust the height/depth of the wall at the sea side.

3. A method as claimed in claim 1, characterized in that the opening toward the sea is blasted out all the way from the bottom of the well.

4. A method as claimed in claim 3, characterized in that the opening towards the sea is expanded in a funnel-like manner, preferably with outwardly arcuated walls.

5. A method as claimed in claim 1, characterized in that the rock partition wall is bolted/stretch reinforced in a vertical direction.

* * * * *